United States Patent
Cadden et al.

(10) Patent No.: US 7,065,765 B2
(45) Date of Patent: Jun. 20, 2006

(54) SERIALIZING EVENT HANDLING IN A THREADED SYSTEM WITH NO WAIT STATES

(75) Inventors: William S. Cadden, Saugerties, NY (US); Patricia E. Heywood, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 10/004,553

(22) Filed: Dec. 5, 2001

(65) Prior Publication Data

US 2003/0120623 A1    Jun. 26, 2003

(51) Int. Cl.
*G06F 9/46*    (2006.01)

(52) U.S. Cl. .................... 718/102; 719/318
(58) Field of Classification Search ................ 718/107, 718/102, 108, 106, 104; 719/313, 318, 104; 710/36, 220; 712/245, 220; 711/152, 150
See application file for complete search history.

(56) References Cited

U.S. PATENT DOCUMENTS

| | | | | |
|---|---|---|---|---|
| 3,886,525 | A * | 5/1975 | Brown et al. ............... | 711/147 |
| 4,847,754 | A * | 7/1989 | Obermarck et al. ........ | 718/104 |
| 5,109,511 | A * | 4/1992 | Nitta et al. ................. | 718/104 |
| 5,307,487 | A * | 4/1994 | Tavares et al. ............. | 707/8 |
| 5,390,328 | A * | 2/1995 | Frey et al. .................. | 719/315 |
| 5,511,192 | A * | 4/1996 | Shirakihara ................. | 718/106 |
| 5,548,760 | A * | 8/1996 | Healey ....................... | 719/314 |
| 5,630,134 | A * | 5/1997 | Haga .......................... | 718/106 |
| 6,128,710 | A * | 10/2000 | Greenspan et al. ......... | 711/152 |
| 6,237,019 | B1 * | 5/2001 | Ault et al. .................. | 718/104 |
| 6,636,883 | B1 * | 10/2003 | Zebrowski, Jr. ............ | 718/102 |
| 6,651,146 | B1 * | 11/2003 | Srinivas et al. ............. | 711/150 |
| 6,799,317 | B1 * | 9/2004 | Heywood et al. ........... | 719/313 |

OTHER PUBLICATIONS

IBM TDB, "Compare and Swap Implementaion of Task Logic", Jul. 1973, pp. 474-476.*
J. Valois, "Lock Free Linked List Using Compare-and-Swap", ACM 1995, pp. 214-222.*
M. Herlihy, "Wait-Free Synchronization", ACM, 1991, pp. 124-149.*
"Shared/Exclusive Latch Serialization by Obligation ", IBM TDB, Aug. 1993, pp. 19-22.*

* cited by examiner

*Primary Examiner*—Sue Lao
(74) *Attorney, Agent, or Firm*—Lawerence D. Cutter

(57) ABSTRACT

Event handling in multinode data processing networks, in which data structures are shared between nodes and are subject to concurrent requests for access, is facilitated through the use of a separate small data structure (bit array or linked list) which permits an event handler to hand off the task of accessing the data structure to an event handler which is already accessing data from the same data structure. This eliminates the need for locking arrangements and/or the use of special coordinating event handlers.

18 Claims, 12 Drawing Sheets

SERIALIZING EVENT HANDLING IN A THREADED SYSTEM WITH NO WAIT STATES

BACKGROUND OF THE INVENTION

The present invention is generally directed to the handling of events in a data processing system. More particularly, the invention is directed to a system and method for event handling which employs a shared data structure which enables one thread to handle events originally presented to a different thread. Even more particularly the present invention enables one thread to pass event handling to another thread so that one thread does not have to wait for another thread to finish before the event is handled.

The present invention is employed in computer systems where multiple threads handle a number of events. However, at any given time only one thread is permitted to handle a given event. Thus, multiple threads are not allowed to work at the same time to handle the same event. An example of where such a requirement exists is when there is one thread associated with each adapter attached to a computer. (For purposes of best understanding the structure and operation of the present invention, an adapter is generally understood to mean a data communication device which permits the transmission of messages from one data processing node to another; in general, each data processing node includes its own random access memory and one or more data processing elements. The nodes transmit messages by means of individual adapter units through a switch which directs transmitted messages to receiving adapters in a multinodal data processing network).

If threads need to access a common data structure (as they do from time to time) only one thread is permitted to access this data structure at any given point in time. When the threads are doing work specific to their individual nodes, they can each work independently. However, when threads need to access a common resource through an adapter unit, such as a common data structure, only one thread is executed at a time.

The above situation is common in computer programs and there are various methods that may be employed to handle it. However, there are two additional requirements that complicate the present matter and make the current invention even more necessary. First, because of the time element involved in establishing, using and dismantling a system of locks and keys, it is not desirable to employ threads which use locking mechanisms as a solution to the data access problem herein since this use introduces appreciable amounts of undesirable wait times. Even though the use of locks is one of the ways to solve the problem of multiple threads seeking to access a common data structure, the desire to avoid the use of locks makes the solution to the present problem that much more difficult.

Another mechanism which is employable in solutions to the multiple thread access problem is through the creation of an entirely new and separate thread whose sole responsibility is managing access conflicts. However, the overhead associated with such a thread introduces another limitation in the path toward a solution of the multiple thread access problem. This second solution limitation also complicates the present matter since it is undesirable to create a thread that is used specifically and solely to access a shared resource, such as a shared data structure. This rules out the approach to the solution of this problem in which all access to the common resource is handled by a special thread that is dedicated only to that job. The overhead associated with establishing, managing, using and (eventually) closing such an additional thread is undesirably large.

SUMMARY OF THE INVENTION

One aspect of the current problem is, however, used to advantage in the present invention, namely the fact that it does not matter which thread actually accesses the common resource. So, in accordance with a preferred embodiment of the present invention, if a first thread wants to access a common resource, but it cannot because a second thread is already accessing it, the first thread "tells" the second thread that, when the second thread is finished with the work which it is doing, the second thread should then do the work that the first thread needs to be done. The communication mechanism for this process is implemented via a relatively small data structure that the threads are able to exploit for purposes of communicating details regarding proper handling of such events.

In accordance with another aspect of the present invention, a method is provided for handling events in a data processing system in which at least two threads access the same data, and in which there is provided a step for handing off the task of accessing said data from a first event handler to a second event handler that is already accessing said data. In accordance with another embodiment of the present invention, there is provided a method for handling events in a multithreaded data processing system which there is included a step of insuring that only one thread gains control at a time so that a first thread, which has an event that needs to be handled at the time that a second thread is handling said event, passes the handling of the events from the first thread to the second thread, whereby the first thread does not need to wait for the second thread to finish and whereby no thread waits for a significant amount of time for another thread to finish.

Accordingly, it is an object of this invention to improve event handling in data processing systems in which multiple threads access the same data.

It is a further object of the present invention to eliminate the need for establishing lock structures when multiple threads need to handle events which involve access to shared data.

It is a still further object of the present invention to eliminate the need to establish a separate thread to handle event driven access to shared data.

It is yet another object of the present invention to provide a relatively small data structure which facilitates sharing of event handling between threads.

It is also an object of the present invention to improve event handling within networks of multiple nodes.

It is another object of the present invention to provide event handling capabilities which are specifically directed to systems which employ adapter units for inter nodal communications.

It is also an object of the present invention to provide a mechanism in which an event which is presented to one thread to be handled is actually handled by a thread that is currently accessing the same data.

It is a still further object of the present invention to provide an inter thread communication mechanism.

It is yet another object of the present invention to avoid conflicts between threads sharing common access to shared data and data files.

Lastly, but not limited hereto, it is an object of the present invention to improve the speed and efficiency at which data is accessed when access is shared between threads.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

The present invention advantageously employs Compare_and_Swap functionality (see FIG. 6) to change a relatively tiny data structure without causing the thread to wait a significant amount of time. In particular, the use of this functionality typically allows the handling of the event to be initiated in just a few instruction cycles, whereas other approaches to this problem, such as those described above, typically employ hundreds or even thousands of machine instruction cycles to accomplish. Accordingly, in this fashion, significant time spent waiting for a thread to terminate is avoided. The event is actually handled by a different thread, but this thread is one that is already accessing the shared data which is a factor that makes the process that much more speedy and efficient.

Figure 1:
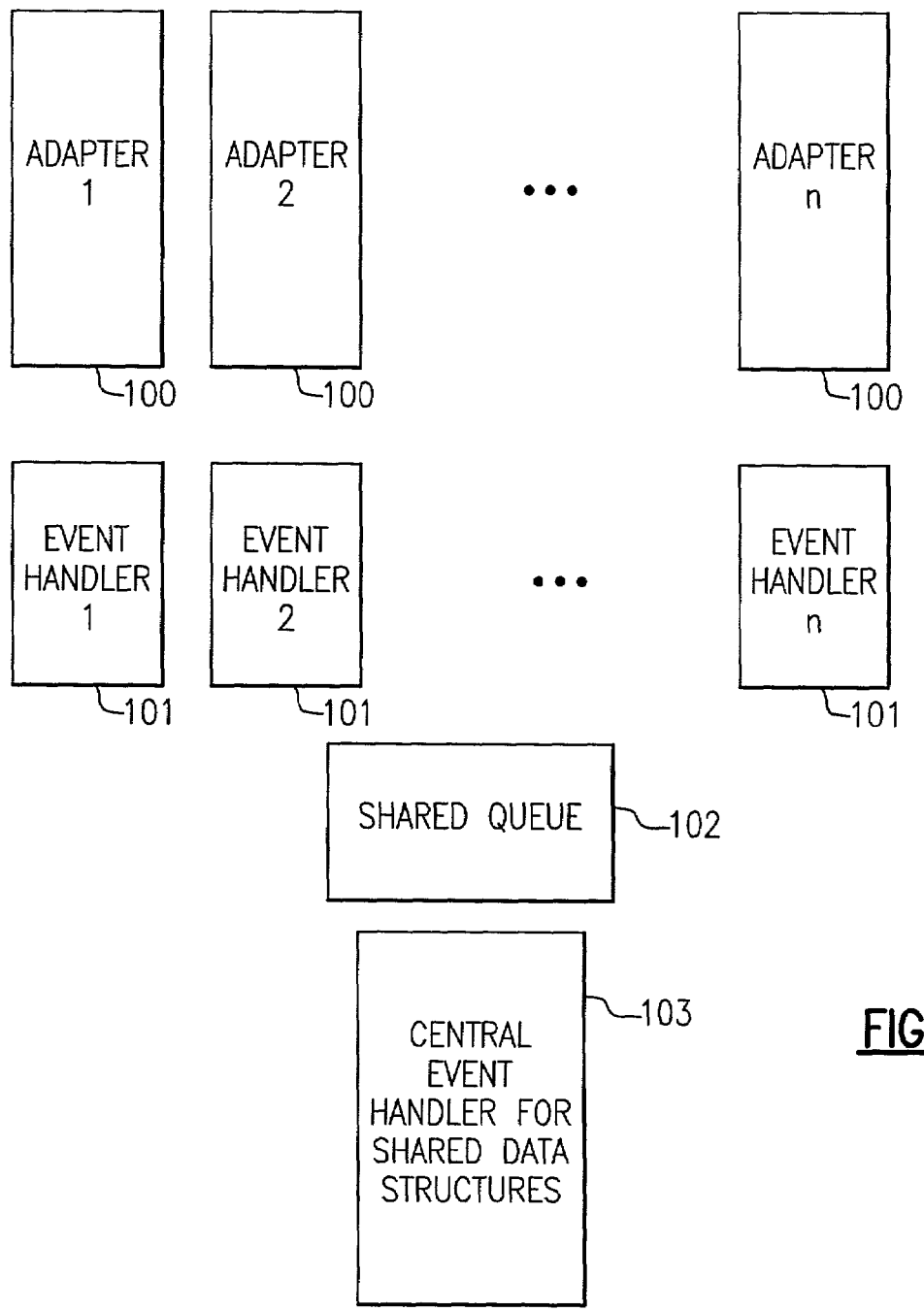
FIG. 1 is a block diagram illustrating an approach to the problem considered herein wherein a dedicated thread is established for coordinating access to common data.

FIG. 1 illustrates a structure for handling the problems set out herein. In particular, it is seen that each adapter 100 is serviced by a corresponding event handler 101. The system shown in FIG. 1 also employs a separate central event handler 103 which coordinates all access through the n adapter units 100. The use of shared queue 102 by central event handler 102 provides a single point of access. One of the major problems with this structure is that it requires a multilevel event handling structure.

Figure 2:
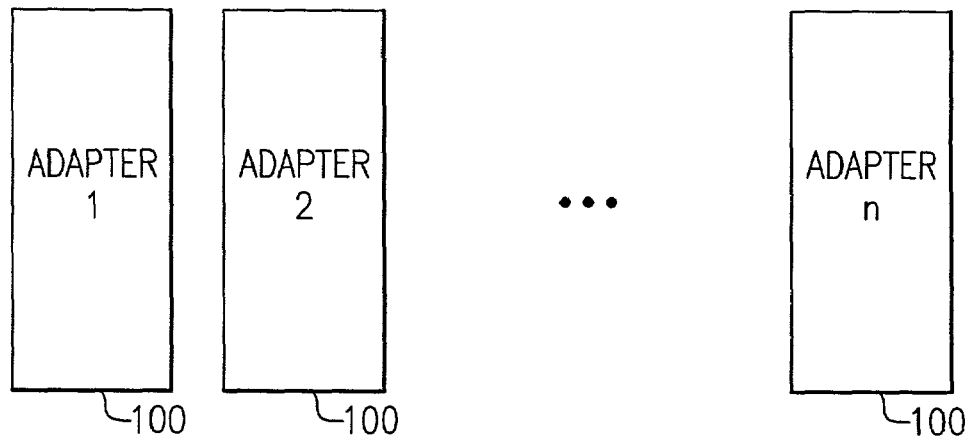
FIG. 2 is a block diagram similar to FIG. 1 but illustrating an approach to the problem considered herein wherein a shared lock structure is employed.
Figure 2:
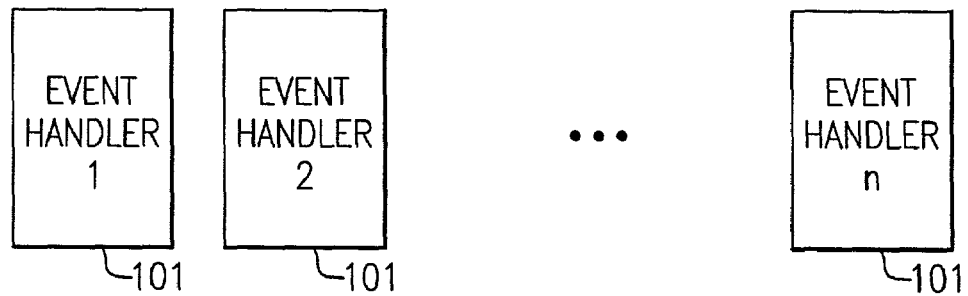

FIG. 2 illustrates yet another approach to the solution of the problems whose solution is sought. The system of FIG. 2 is similar to the system shown in FIG. 1 except that instead of employing a separate event handler for coordinating access through adapters 100, a shared lock 110 is employed. In this system a shared lock is obtained by event handlers 101 before handling an event. If, at the time of the event, the lock is "owned" by another event handler, the event handler that needs it has to wait until the lock is relinquished by the current owner. This is a disadvantageous use of time.

Figure 3:
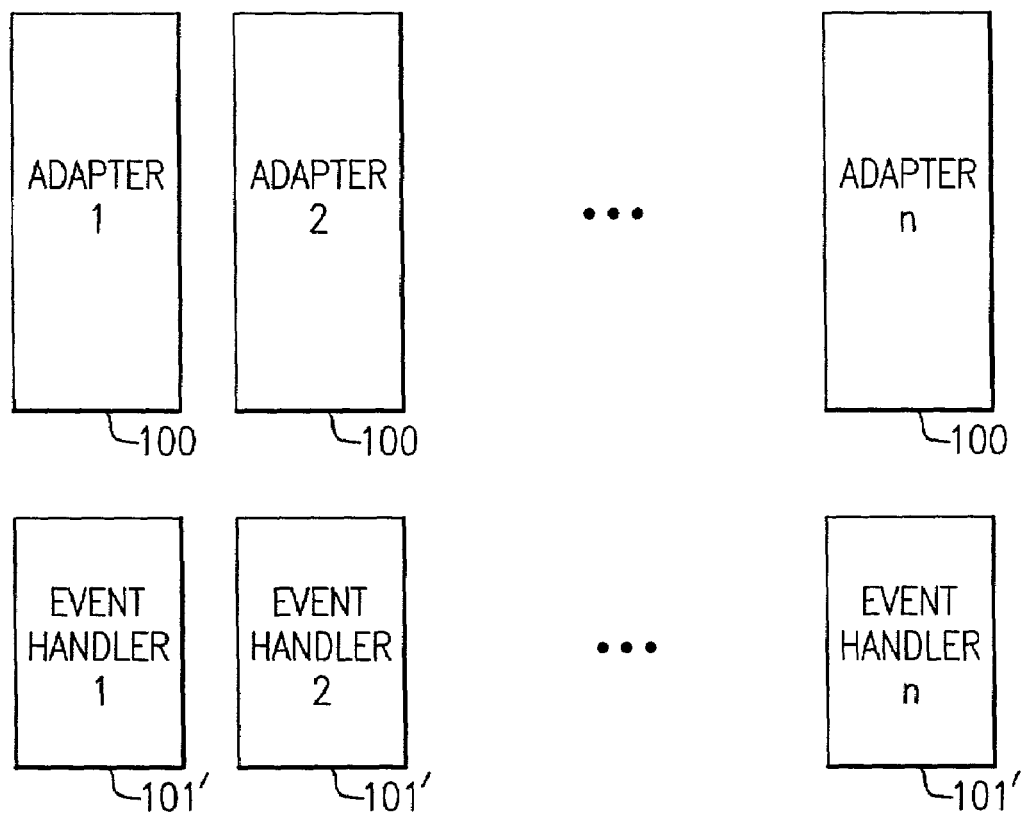
FIG. 3 is a block diagram illustrating the task structure extant in the solution to the presently posed problem as employed in the present invention.

Whatever specific disadvantages are possessed by systems shown in FIGS. 1 and 2, in general they fail to appreciate that the handling of data access events does not necessarily have to reside within the sole domain and control of any specific event handler. Through the use of specially modified event handlers 101', as shown in FIG. 3, the unnecessary locking and queuing structures 102, 103 and 110 are avoided. The modifications to event handling mechanisms, as described below, are relatively minor yet produce savings in time, increase efficiency and reduce overhead.

The threads are event driven, that is, if an event is detected by one of the threads, that thread attempts to handle the event. If the handling of the event requires exclusive access to some resource for a time, for example a shared data structure, one should insure that no other thread accesses the resource at the same time. In accordance with the present invention, if a second thread is accessing the shared resource at the time the first thread attempts to access it, the first thread does not wait for the second thread to finish accessing the resource, but instead sets up a data structure to tell the second thread that when the second thread finishes handling the events it is currently handling, it should also handle the event the first thread is trying to handle.

The data structure that is used to tell the second thread to handle the event the first thread could not handle can take a number of forms. If the events are simple, a bit array is sufficient. FIG. 4 (with portions 4A to 4D) illustrates a preferred embodiment of the present invention for the case of handling relatively simple events through the use of one or more bit arrays which are used by event handlers 101' in handing off event handling tasks to a different event handler, and in particular, to the event handler that currently has access. Each bit in the array indicates that some event is waiting to be handled. For example, define EVENT_1 0x00000001 could indicate that if bit 0x00000001 is set EVENT_1 is to be handled;

define EVENT_2 0x00000002 could indicate that if bit 0x00000002 is set EVENT_2 is to be handled, and so on.

When a thread is waiting for an event to be handled, an indication of this fact is stored in a shared word called waiting_events. Every time an event can't be handled by the thread that first attempts to handle it, it is added to waiting_events, so that when the second thread, which is the one that is currently handling events, finishes with the events it is handling, the second thread finds bits set in waiting_events and "knows" that more events are to be handled. The compare_and_swap function is used to insure that, when a thread attempts to set waiting_events, it does not overwrite a value that another thread has written concurrently. For a complete description of the operation of the compare_and_swap function, see FIG. 6 and the discussion below pertaining to FIG. 6.

Two values for waiting_events are provided herein as being reserved. The first such reserved value indicates that no events are waiting and that no events are being handled at the current time. In the present discussion a value of "−1" is used for this value. It is noted, however, that any unique value may be employed for this purpose. The second reserved value indicates that no events are waiting but that events are being handled by a thread. In the present discussion, a value of "0" is used for this latter value. Again, in general, any unique identifiers may be employed.

FIG. 4 is a flow chart (as provided in parts 4A through 4D) which illustrates a preferred method for event handling when the events are relatively simple, as for example when the order of handling is not relevant. For more complex situations, the flow chart shown in FIG. 5 and discussed below is preferably employed.

Initially, in step 200, local_type is set equal to the type of event which is to be handled. Next the variable repeat is set equal to "TRUE" in step 201 so as to provide a mechanism for repeated cycling through the process as is sometimes needed. If a later encountered step has set repeat to a value other than "TRUE" the test in step 202 provides a mechanism for terminating event handling (block 203). If repeat is still "TRUE" then cur_type is set equal to −1 in step 204. (The selection of this particular choice as an indicator of status is discussed elsewhere herein.) The compare_and_swap function is employed to set waiting_events to 0 if its value is equal to cur_type. If the compare_and_swap is successful, the variable test is set to reflect this fact. If compare_and_swap fails, cur_type is set to the current value of waiting_events. Following use of the compare_and_swap function in step 205, the test variable is set equal to the return code from the compare_and_swap function to provide an indication of whether or not the comparison was a success. The test variable is tested in step 206. If the comparison failed, the next step is step 215 (shown on the top of FIG. 4C). If the comparison matched, then the next step is step 207 (shown on the top of FIG. 4B).

In step 207, it is established that event handling is not in a terminated status, thus done is set equal to "FALSE." This sets up an inner loop for event processing. In particular, testing step 208 provides a point of re-entry for determining the current status of the done variable. In the comparison carried out in step 208, if done is found to be "TRUE" a return is made to step 202 to query the value of repeat. Otherwise, processing continues at step 209 wherein the events as specified in local_type are handled. It is at this step that data access to shared resources typically occurs. However, the nature of the handled events is not limited to this particular variety. Following step 209, cur_type is set to 0 in step 210 and the compare_and_swap function is employed again in step 211 to attempt to set waiting _types to −1 to indicate that the thread is done handling events. If the results of the compare_and_swap in step 211 are not successful, which indicates that the thread has more events to handle, then processing continues at step 218 (see FIG. 4D). As above, the test variable is set to a value which reflects the result of the compare_and_swap operation in step 211. If the test is successful (that is, waiting_events was set to indicate that no thread is handling events) repeat is set equal to "FALSE" in step 213 and done is set equal to "TRUE" in step 214 and processing thereafter continues at step 208 which provides an immediate pass through back to step 208 which, in turn, given the most recent value for repeat, terminates the process at block 203.

Figure 4A:
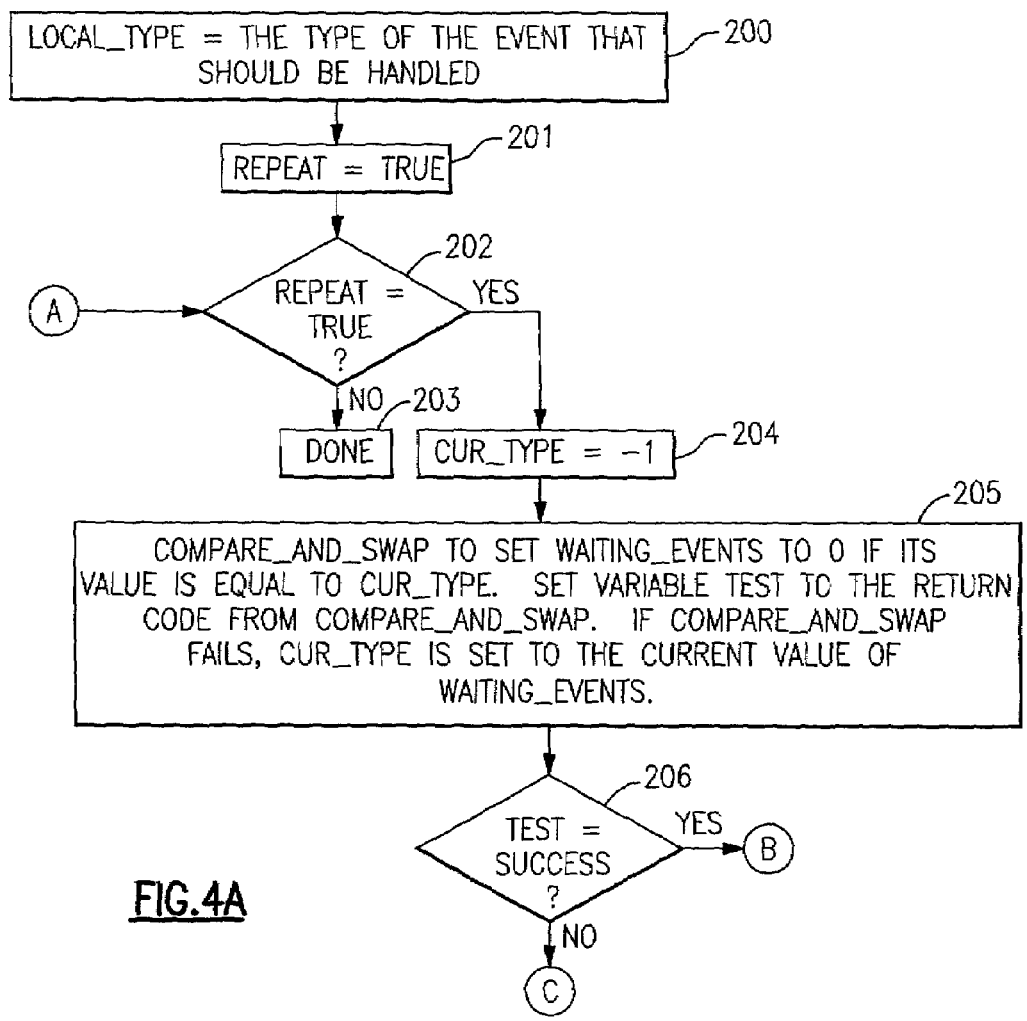
FIG. 4A–D is a flow chart illustrating a method of solving the problem of access to common data by multiple threads through the use of bit arrays to establish communication of relatively simple signal indications between threads.
Figure 4B:
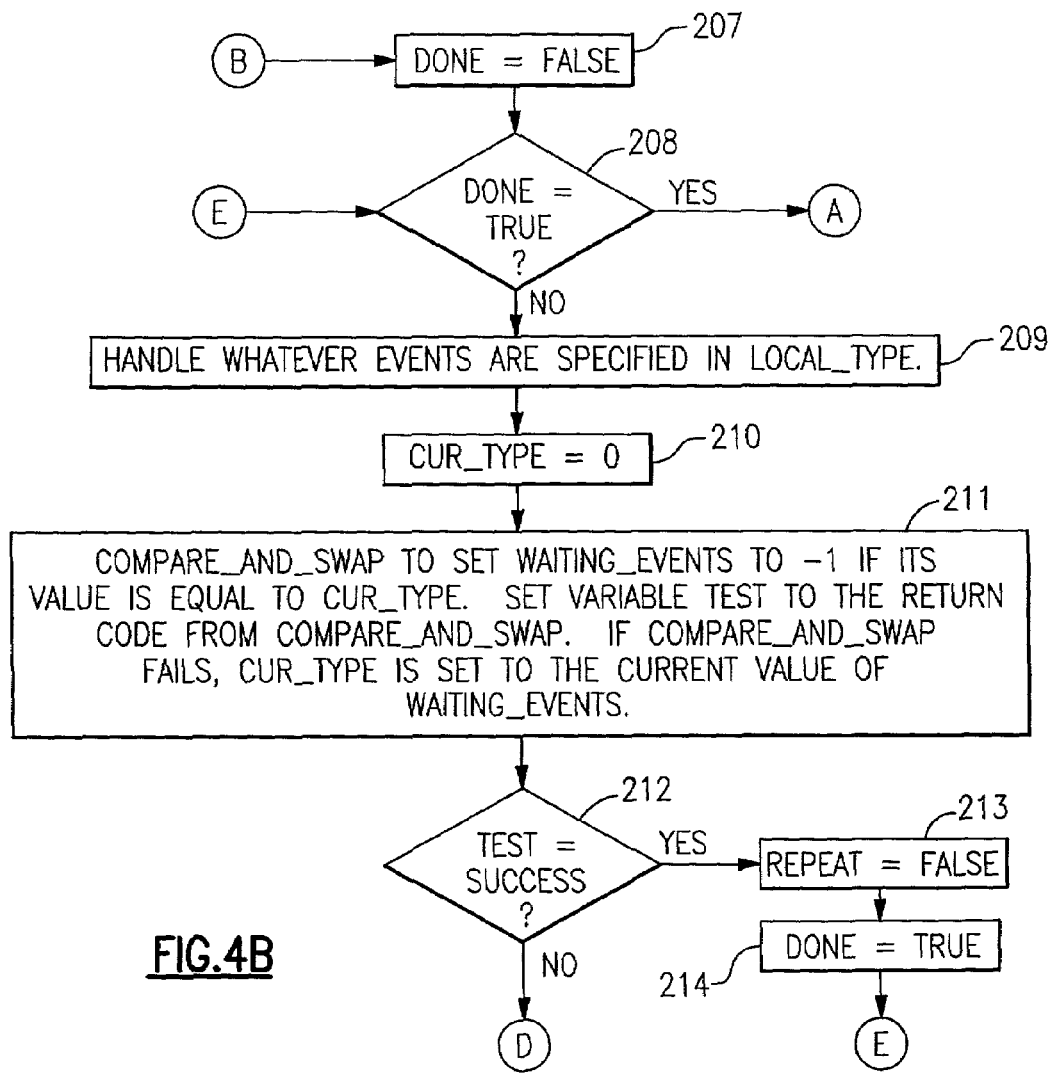
Figure 4C:
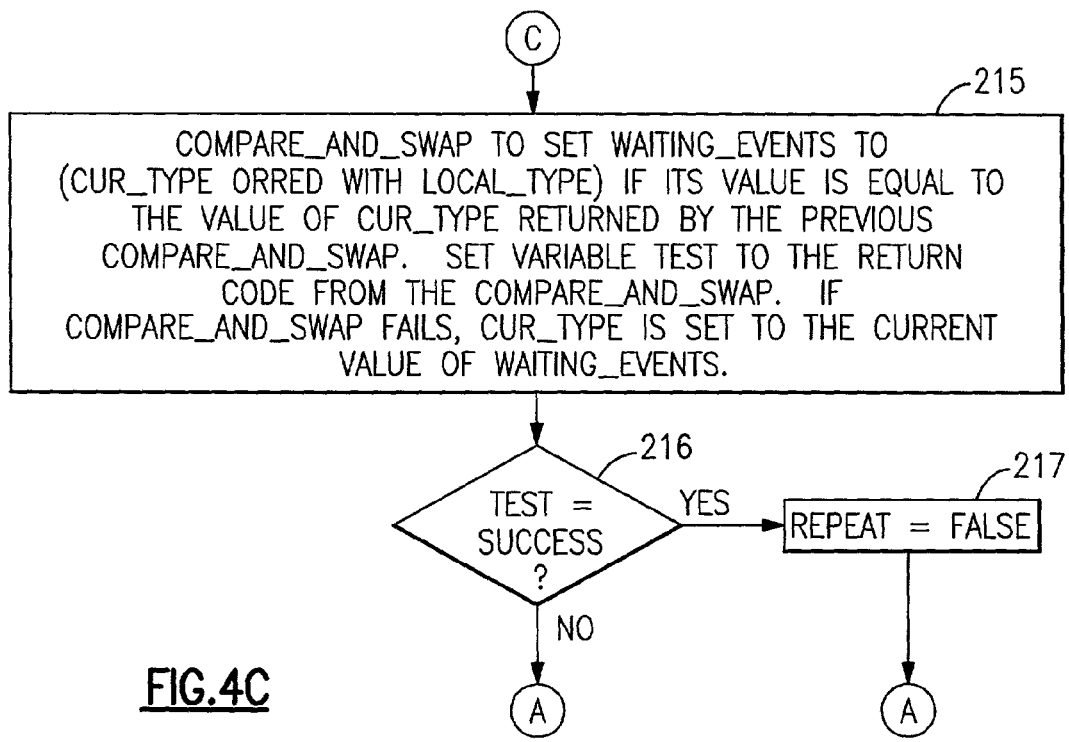
Figure 4D:
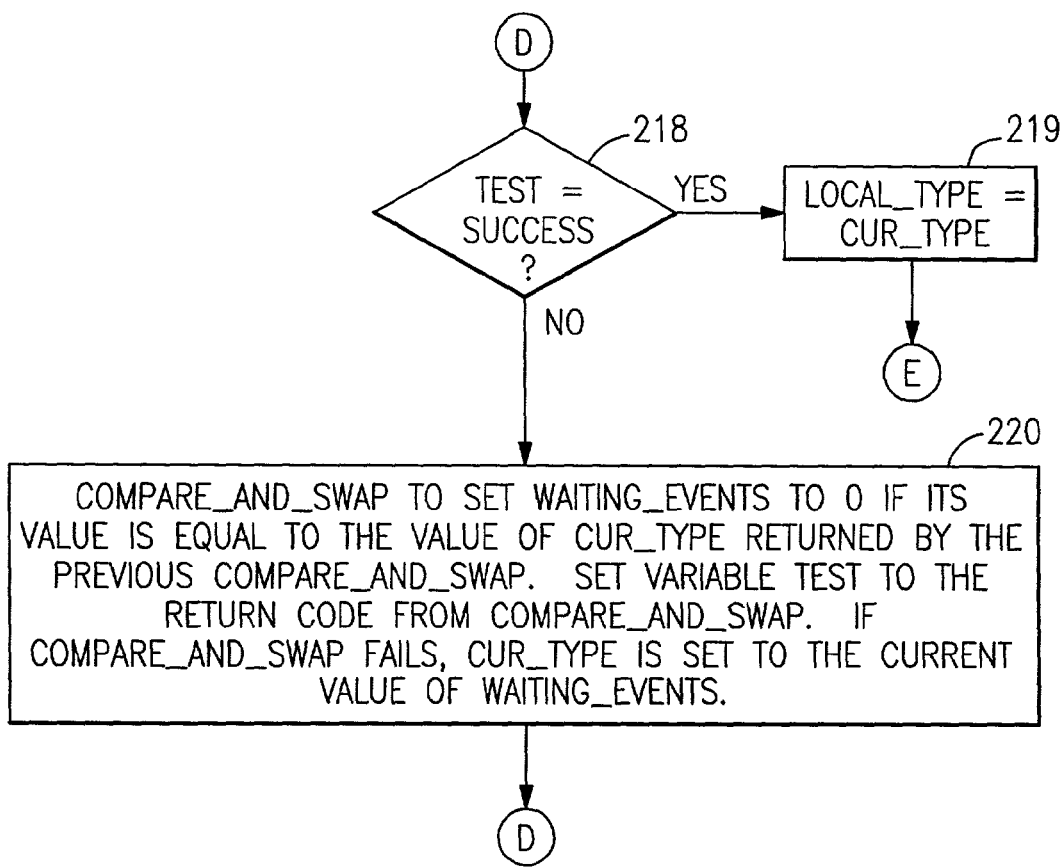
Figure 5A:
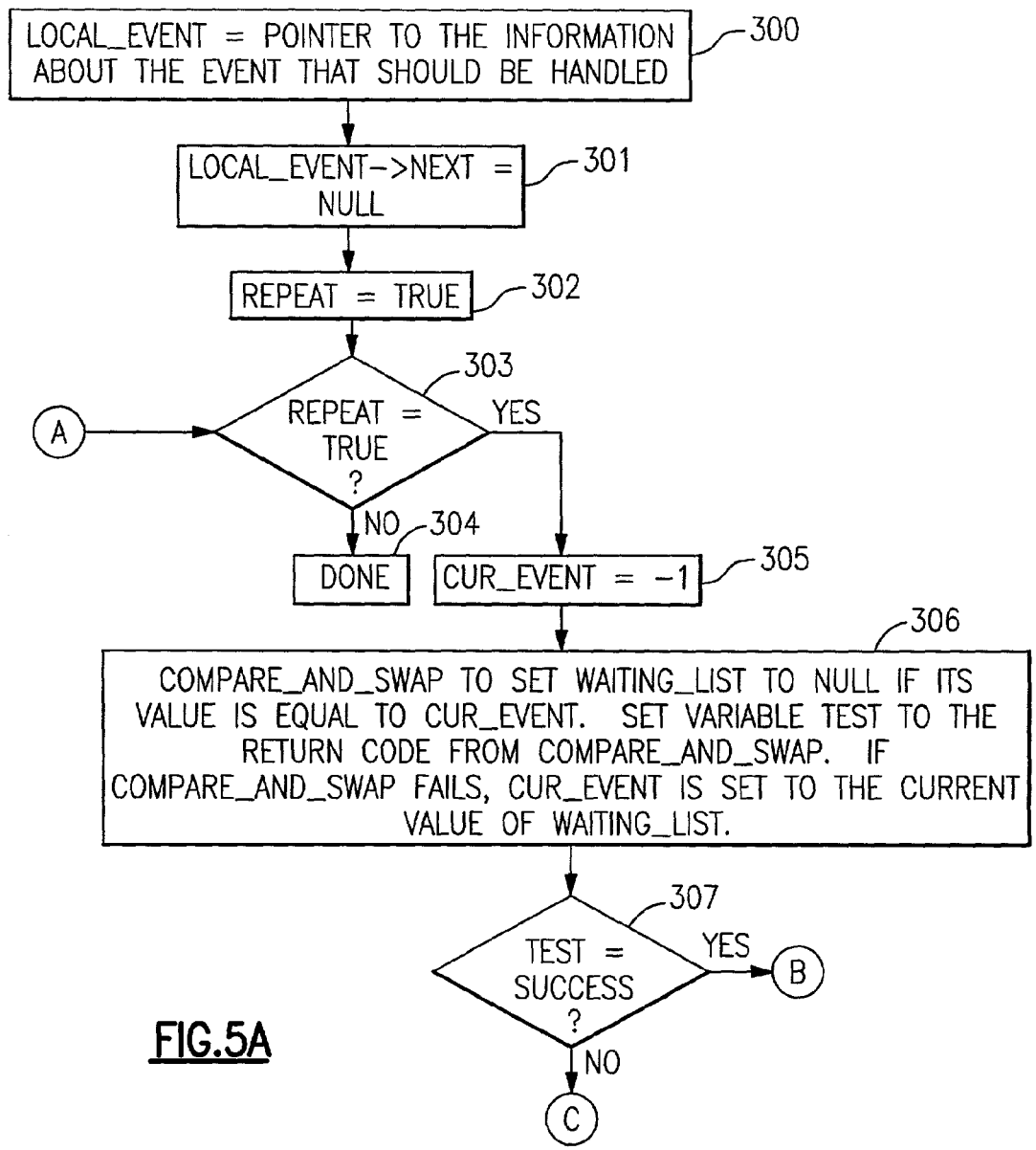
FIG. 5A–D is a flow chart, similar to the one shown in FIG. 4A–D, illustrating a method of solving the problem of access to common data by multiple threads through the use linked lists so as to provide a greater degree of flexibility and complexity in multithread event handling.
Figure 5B:
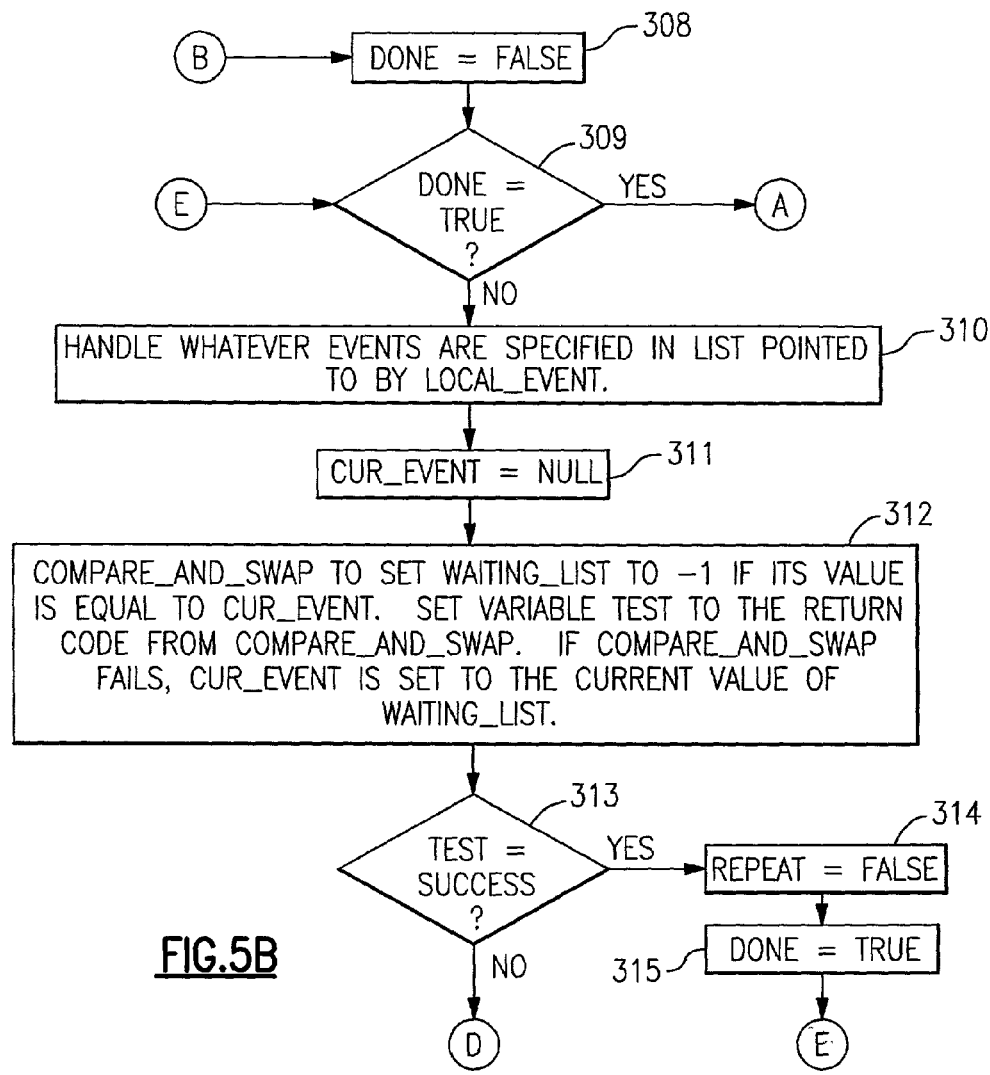
Figure 5C:
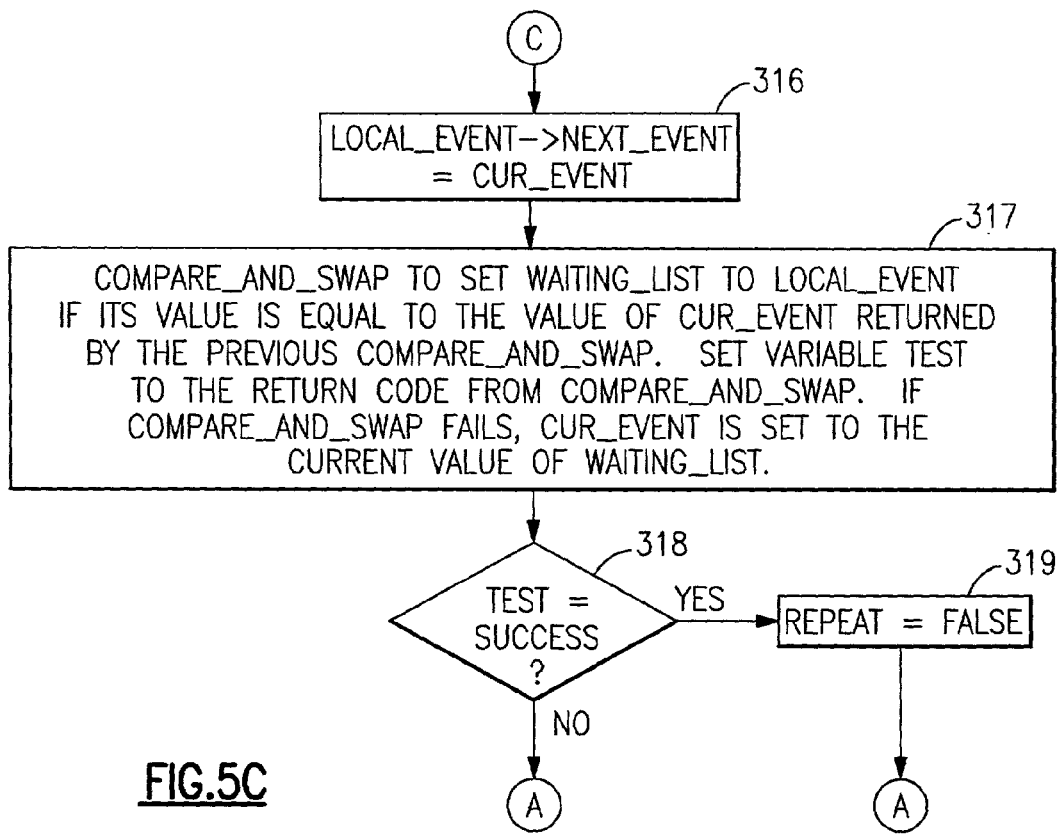
Figure 5D:
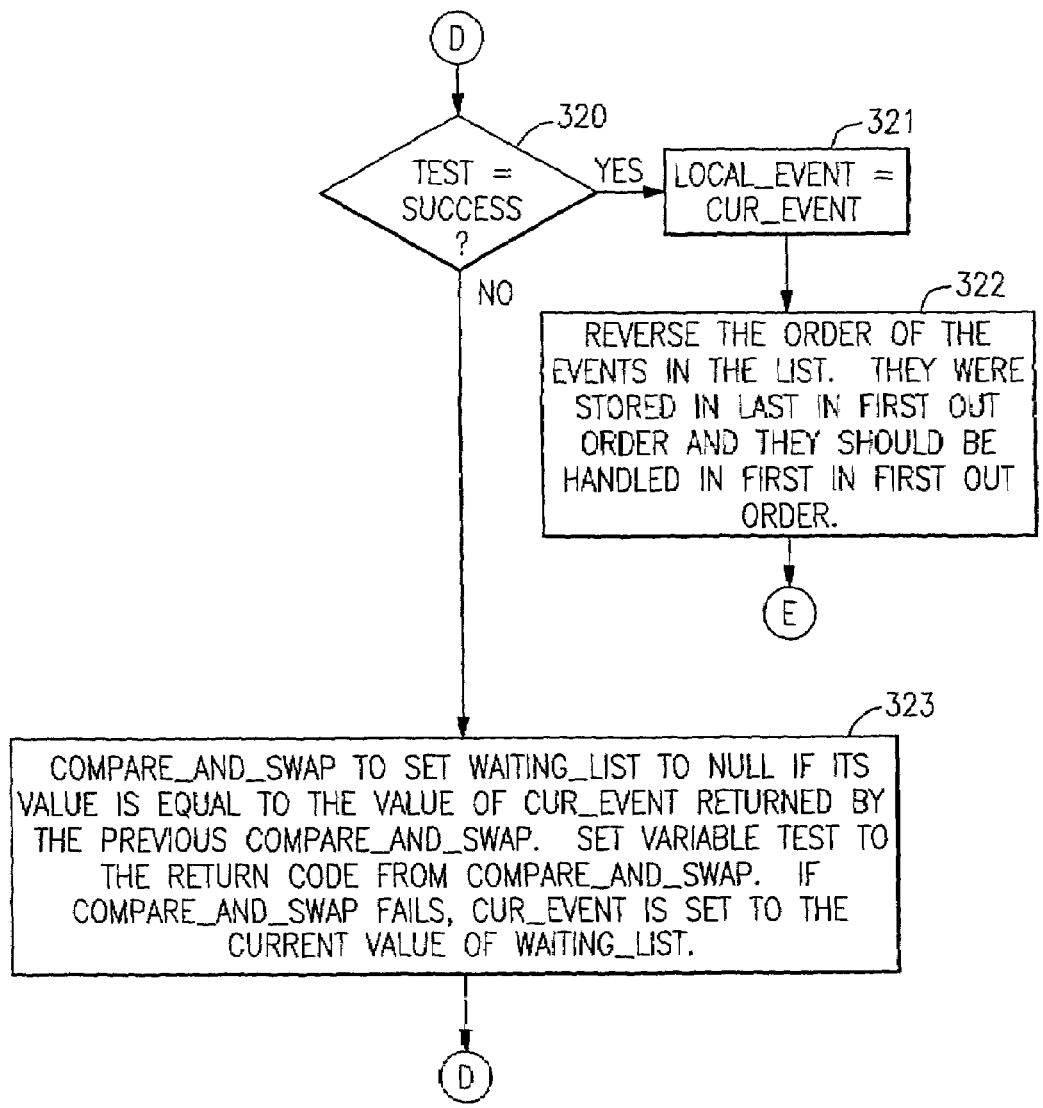

Following an unsuccessful test comparison in step 206, processing continues with the use of the compare_and_swap function in step 215 (see the top of FIG. 4C). If the result of the compare_and_swap operation are successful (that is, a match) this step sets to (cur_type OR local_type). This tells the thread that is currently handling events that it should also handle any events specified in local_type. The test for a successful match is whether or not the current value of waiting_events is equal to the value of cur_type returned from the previous invocation of the compare_and_swap function. As above, the test variable is set to the return code from the compare_and_swap operation. A test is made (step 216) to determine the current contents of the test variable. If the test was a success, processing continues at step 202. If the test was not successful, repeat is set equal to false prior to returning to step 202. Everything is complete at this point since the thread that is executing has passed its event to the thread that is handling events.

Next is considered the processing that occurs in comparison step 218 which is entered either after step 212 or after step 220. Since this step is enterable after performing step 220, the variable test must be reexamined; in particular, it is noted that the results from test step 212 may have changed as a result of the performance of step 220. If the test is successful, as determined in step 218, local_type is set equal to cur_type and processing continues at step 208. Step 220 tries to set waiting_events to 0, indicating that the current thread will continue to handle events. The events that are handled are those specified in variable cur_type and copied into local_type. If the test is not successful, the compare_and_swap function is again invoked to set waiting_events to 0 if its value is equal to the value of cur_type as returned from the previously executed instance of the compare_and_swap function. The test variable is set equal to the return code as provided by execution of the compare_and_swap function. If the comparison fails, cur_type is set equal to the current value of waiting_events. Following execution of step 220, processing resumes at step 218, as discussed above.

If, as discussed above, more complex events are to be handled, particularly ones in which precedential order is important or even desirable, event handling is carried out using a linked list whose structure is shown elsewhere. The process for this situation is shown in FIG. 5. The flowchart therein is substantially the same as the flowchart and process in FIG. 4 which is discussed in detail above. However, there are two principle differences. In place of the use of a bit array for controlling current events, a linked list is employed. Thus a "zero" condition in a bit array is more properly handled as a "NULL" indication in the context of linked lists. Additionally, there is an additional step 322 which follows step 321. In step 322, the order of the events in the list are reversed since they would normally be stored in a last-in-first-out (LIFO) order and it is typically desired that they be handled in a first-in-first-out (FIFO) order. Apart from these two differences, the discussion above with respect to FIG. 4 is equally applicable to FIG. 5.

If the events are more complicated than this, as for example when it is desirable to store information about the events, or if the events are to be handled in the same order in which they were received, a linked list may be employed. In a case such as this, information about each event is stored in a structure which contains the information and a pointer to the next event in the list of events. In the case of relatively complicated events, a preferred method of the present invention is illustrated in FIG. 5 (with flow chart portions 5A through 5D). In particular, this method employs linked lists. The structure of such a list is set forth in Table I below:

TABLE I

```
typedef struct event_info_struct {
int event_type;          /* The type of the event */
# define EVENT_TYPE_1 1
# define EVENT_TYPE_2 2
.
.                        /* More event types */
.

struct event_info_struct *next_event;/* Pointer to next event in the list
*/
.                        /* More information about the event */
.
.
} event_info;
```

When a thread is waiting for an event to be handled, an indication of this fact is stored in a shared list that is pointed to by a pointer to event_info called waiting_list. Every time an event can't be handled by the thread that first attempts to handle it, it is added to the list pointed to by wating_list, so that when the second thread, which is the one currently handling events, finishes with the events it is handling, it finds the new events added to waiting_list. The second thread then "knows" that these events are to be handled. The compare_and _swap function is used to insure that when a thread attempts to set waiting_list that it does not overwrite a value that another thread has written concurrently.

Two values for waiting_fist are reserved. The first value indicates that no events are waiting and that no events are being handled at the current time. In the present discussion we use "−1" for this value. The second reserved value indicates that no events are waiting but that events are being handled by a thread. We will use NULL for this value. As above, any convenient different and otherwise unique values could be employed for this purpose. These two are, however, convenient from a programmatic viewpoint.

The following (Table II) shows the outline of program code useful for handling multiple threads with events when the events are simple enough for indicators to be stored in a bit array.

TABLE II

```
void *
serialize_events(
    uint event_type) /* The type of event that should be handled. Each unique
                        type of event is represented by a bit in the integer.
                        The top bit in the integer does not represent an event;
                        this allows us to use a value of −1 to represent
                        the state in which no events are being handled or waiting
                        to be handled by a thread. */
{
    int test;
    int repeat = TRUE;
    uint cur_type;
    uint local_type = event_type;
    uint done;
    while (repeat) {
        /* The calls to compare_and_swap are used to handle timing problems.
            Every time one goes to set waiting_events there could be a race
            condition between threads. compare_and_swap is a non-waiting
            function that sets a variable to a second value only if the variable
            contains the first value. It returns a "1" if it succeeds and a "0" if it
            fails. By checking the return value one can tell which thread got to
            the variable first. */
        /* The first compare_and_swap handles the race condition to determine which
            thread has the right to handle events. */
        cur_type = −1;
        test = compare_and_swap(&waiting_events, &cur_type, 0);
        if (!test) {
            /* Another thread got in first. waiting_events may already have some
                other events stored in it, so we will add the new event to it. */
            test = compare_and_swap(&waiting_events, &cur_type,
                cur_type | local_type);
            if (!test) {
                /* Some thread has changed waiting_events in between the
                    two compare_and_swaps. Loop again to try to handle this event. */
            } else {
                /* We have set waiting_events to the event type. This will cause
                    another thread to handle the event. See below. */
                repeat = FALSE;
            }
        } else {
            /* This thread got in first. Handle the event and then try to
                set the waiting_events back to −1. If a failure occurs it is because another
                thread has set it while we were handling these events. */
            done = FALSE;
            while (!done) {
                if (local_type & EVENT_1) {
                    /* Handle an event of type 1. */
                    .
                    .
                    .
                }
                if (local_type & EVENT_2) {
```

TABLE II-continued

```
            /* Handle an event of type 2. */
            .
            .
            .
            }
            .
            .
            .
            cur_type = 0;
            test=compare_and_swap(&waiting_events, &cur_type, -1);
            if (!test) {
                /* The other thread has changed waiting_events, indicating
                    that we should loop again to handle the new events. Set up
                    to handle them the next time through the loop. The next time
                    through the loop we will be handling the values that the other
                    thread has stored. Set up the local variables to do this. */
                while (!test) {
                    /* Handle the fact that waiting_events could be continuing to
                        change while we are trying to set it. */
                    test = compare_and_swap(&waiting_events, &cur_type, 0);
                }
                local_type = cur_type;
            } else {
                /* The other thread hasn't set waiting_events. We are done. */
                repeat = FALSE;
                done = TRUE;
            }
        } /* while (!done) */
    }
} /* while(repeat) */
}
```

The following code outline in Table III below illustrates the handling of multiple threads when there are events that are sufficiently complex that storage of indicators in the form of a linked list is preferred:

TABLE III

```
void *
serialize_events(
    event_info *event_ptr);/* event_ptr contains a information
                                about the event that must be handled. It also contains
                                a pointer field called next_event which can be set to
                                the next event in a list of events. */
{
    int test;
    int repeat = TRUE;
    int done;
    event_info *cur_event;
    event_info *local_event = event_ptr;
    local_event->next event = NULL;/* Indicate only one event is to be
                                handled. */
    while (repeat) {
        /* The calls to compare_and_swap are used to handle timing problems.
            Every time we go to set waiting_list there could be a race
            condition between threads. compare_and_swap is a non-waiting
            function that sets a variable to a 2nd value only if the variable
            contains the 1st value. It returns a 1 if it succeeds and a 0 if it
            fails. By checking the return value we can tell which thread got to
            the variable first. */
        /* The first compare_and_swap handles the race condition to determine which
            thread has the right to handle events. */
        cur_event = -1;
        test = compare_and_swap(&waiting_list, &cur_event, NULL);
        if (!test) {
            /* Another thread got in first. waiting_list may already have some
                other events stored in it, so we will add the new event to it. */
            local_event->next_event = cur_event;
            test = compare_and_swap(&waiting_list, &cur_event, local_event);
            if (!test) {
            /* Some thread has changed waiting_list in between the two
                    compare_and_swaps. Loop again to try to handle this event. */
            } else {
                /* We have set waiting_list to the event type. This will cause
```

TABLE III-continued

```
                    another thread to handle the event. See below. */
                repeat = FALSE;
            }
        } else {
            /* This thread got in first. Handle the event and then try to
                set the waiting_list back to -1. If we fail it is because another
                thread has set it while we were in the user handler. */
            done = FALSE;
            while (!done) {
                while (local_event != NULL) {
                    if (local_event->event type == EVENT_TYPE_1) {
                        /* Handle an event of type 1. */
                        .
                        .
                        .
                    }
                    if (local_event->event_type == EVENT_TYPE_2) {
                        /* Handle an event of type 2. */
                        .
                        .
                        .
                    }
                    .
                    .
                    .
                    local_event = local_event->next_event;
                }
                cur_event = NULL;
                test = compare_and_swap(&waiting_list, &cur_event, -1);
                if (!test) {
                    /* Another thread has changed waiting_list, indicating
                        that we should loop again to handle the new events. Set up to
                        handle them the next time through the "!done" loop. The next
                        time through the loop we will be handling the values that the
                        other threads have stored. Set up the local variables to do
                        this. */
                    while (!test) {
                        /* Handle the fact that waiting_list could be continuing to
                            change while we are trying to set it. */
                        test = compare_and_swap(&waiting _list, &cur_type, NULL);
                    }
                    local_event = cur_event;
                    /* Call a function to reverse the order of the events in the
                        list. The events are currently stored in last-in-first-out
                        order, and we need them in first-in-first-out order. */
                    reverse_list(&local_event);
                } else {
                    /* The other thread hasn't set waiting_list. We are done. */
                    repeat = FALSE;
                    done = TRUE;
                }
            } /* While (!done) */
        }
    } /* while(repeat) */
}
```

Figure 6:
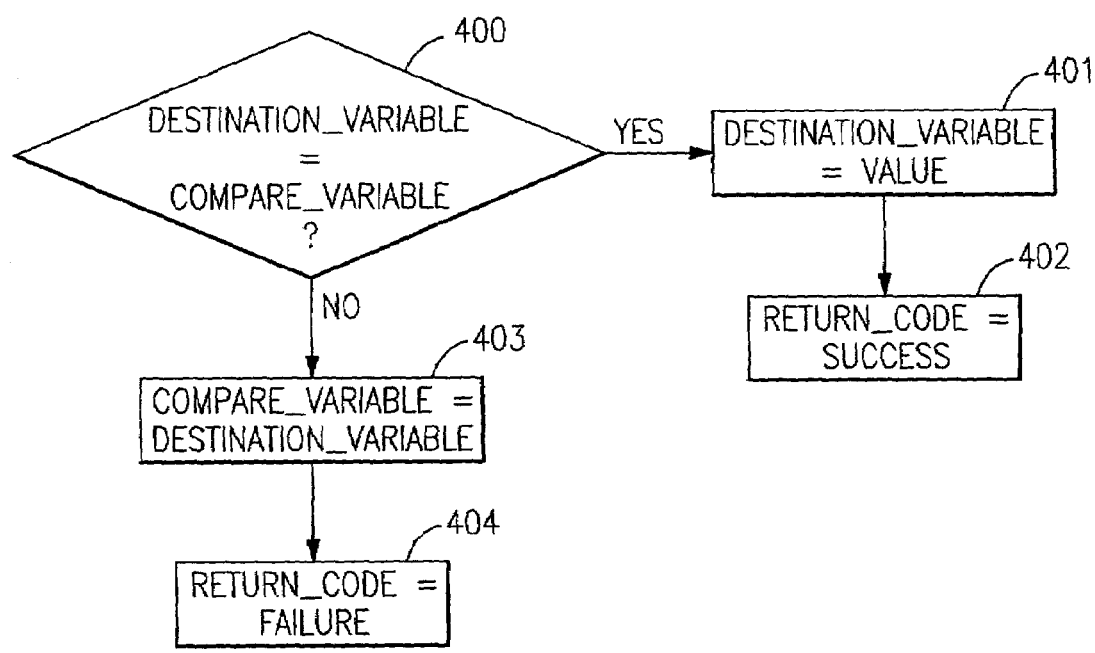
FIG. 6 is a flow chart illustrating operation of the Compare and Swap function.

A Compare_and_Swap function (as implemented in hardware, or in its software equivalent and as illustrated in FIG. 6) compares a first variable (destination_variable) with the value in a second variable (compare_variable) and changes the value in the first variable to a third value ("value" in FIG. 6) if the first variable contains the same value as the second variable. In addition, as considered herein, a Compare_and_Swap function provides a return code of "1" (SUCCESS) if the comparison was successful and the second variable was in fact set equal to the third value; contrariwise, if there was no match from the comparison, then a return code of "0" (FAILURE) is provided. Additionally, if the value in the second variable doesn't match the value of the first variable, the Compare_and_Swap function assigns the value of the first variable (destination_variable) to the second variable (compare_variable). For example, if the second variable contains "-1" and the third value is "0," a Compare_and_Swap on a first variable, conveniently referred to herein as "TEST_VAR" changes TEST_VAR to "0" if and only if TEST_VAR contains a value of "-1." If TEST_VAR contains any other value, for example "-2," the Compare_and_Swap function keeps the current value of TEST_VAR the same but changes the value of the second variable so that its new value is "-2,"; it is also noted that in this case the Compare_and_Swap function provides a return code of "0," indicating that the swap did not occur. If the swap does occur, the Compare_and_Swap function returns with a return code value of "1."

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer implemented method for handling events in a data processing system in which at least two threads access the same data, said method comprising the step of:

handing off the task of accessing said data from a first event handler to a second event handler that is already accessing said data with the use of a compare and swap function to insure that data written between threads is not lost when more than one thread attempts to write to a variable at the same time, said compare and swap function updating an array which contains an indication of a list of events to be handled by the thread that is currently handling events wherein the array is changed from the "no events and no thread handling events" indication to the "no events and a thread is handling events" indication, and in which, upon condition that the thread is unsuccessful in changing the array indication, the thread makes a local copy of the array.

2. The method of claim 1 in which array includes an indicator which signifies that no events are waiting to be handled and that no thread is currently handling events.

3. The method of claim 1 in which the array includes an indicator which signifies that no events are waiting to be handled and that a thread is currently handling events.

4. The method of claim 1 in which the array is changed to the "no events and a thread is handling events" indication so that the thread that makes that change handles subsequent events.

5. The method of claim 4 in which after the events are handled, the thread that is handling the events changes the array from the "no events and a thread is handling events" indication to the "no events and no thread is handling events" indication.

6. The method of claim 5 in which the thread that is handling events changes the array to the "no events and no thread is handling events" indication and terminates and wherein said thread ceases event handling.

7. The method of claim 5 in which upon condition that the thread that is handling events is unable to successfully change said indication, the thread repeatedly attempts said change until it succeeds in saving the indication that is stored in the array and changes the array to the "no events and a thread is handling events" indication.

8. The method of claim 1 in which the thread adds events that it was requested to handle to the local indication in the array and employs the compare and swap function to attempt to replace an old indication in the array with a new local indication.

9. The method of claim 8 in which upon condition that the local array indication is replaced, the first thread is terminated, whereby the first thread has provided a mechanism to have the thread that is currently handling events handle subsequent events.

10. The method of claim 8 in which, upon condition that the local array indication is not replaced, the compare and swap instruction is employed to change the array from the "no events and no thread handling events" indication to the "no events and a thread is handling events" indication.

11. The method of claim 1 in which the list of events is updated by the compare and swap function to contain a list of events to be handled by the thread that is currently handling events.

12. The method of claim 11 in which the list of events includes an indication which signifies that no events are waiting to be handled and that no thread is currently handling events.

13. The method of claim 11 in which the list of events includes an indication that no events are waiting to be handled and that a thread is currently handling events.

14. The method of claim 12 in which the compare and swap function is employed to change the list of events from the "no events and no thread handling events" indication to the "no events and a thread is handling events" indication.

15. The method of claim 14 in which the list of events is changed to the "no events and a thread is handling events" indication so that the thread that makes that change handles subsequent events.

16. The method of claim 15 in which after the events are handled, the thread that is handling the events changes the list of events from the "no events and a thread is handling events" indication to the "no events and no thread is handling events" indication.

17. The method of claim 16 in which the thread that is handling events changes the list of events to the "no events and no thread is handling events" indication and wherein said thread ceases event handling.

18. The method of claim 16 in which, upon condition that the thread that is handling events is unable to successfully change said indication, the thread repeatedly attempts said change until it succeeds in saving the indication that is stored in the list of events and changes the list of events to the "no events and a thread is handling events" indication.

* * * * *